United States Patent
Zhang et al.

(10) Patent No.: US 8,421,859 B2
(45) Date of Patent: Apr. 16, 2013

(54) CLEAR PATH DETECTION USING A HIERACHICAL APPROACH

(75) Inventors: Wende Zhang, Shelby Township, MI (US); Sanjeev M. Naik, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 699 days.

(21) Appl. No.: 12/581,687

(22) Filed: Oct. 19, 2009

(65) Prior Publication Data

US 2010/0097456 A1    Apr. 22, 2010

Related U.S. Application Data

(63) Continuation-in-part of application No. 12/474,594, filed on May 29, 2009, which is a continuation-in-part of application No. 12/108,581, filed on Apr. 24, 2008.

(51) Int. Cl.

| H04N 7/00 | (2011.01) |
|---|---|
| H04N 7/18 | (2006.01) |
| G08G 1/123 | (2006.01) |
| G06K 9/00 | (2006.01) |
| G06K 9/62 | (2006.01) |
| G06K 9/34 | (2006.01) |
| G06K 9/38 | (2006.01) |
| G05D 1/00 | (2006.01) |
| G05D 3/00 | (2006.01) |
| G05D 22/00 | (2006.01) |
| G06F 7/00 | (2006.01) |
| G06F 17/00 | (2006.01) |

(52) U.S. Cl.
USPC .......... 348/119; 348/118; 340/988; 340/989; 340/990; 340/991; 340/992; 340/993; 340/994; 340/996; 382/103; 382/104; 382/159; 382/165; 382/170; 382/171; 382/172; 382/173; 701/1; 701/28

(58) Field of Classification Search .......... 340/988–996; 348/118, 119; 382/103, 104, 159, 165, 170–173; 701/1, 28
See application file for complete search history.

(56) References Cited

U.S. PATENT DOCUMENTS

| 6,401,038 B2 * | 6/2002 | Gia | 701/301 |
| 6,895,115 B2 * | 5/2005 | Tilton | 382/180 |

(Continued)

FOREIGN PATENT DOCUMENTS

| DE | 10 2006 060 893 A1 | 11/2007 |
| DE | 10 2006 046 843 A1 | 4/2008 |

(Continued)

OTHER PUBLICATIONS

Xiaowen Wu; Yuxin Peng; Donghua Ding; Huaping Liu; Kezhong He; Fuchun Sun; , "Color vision-based multi-level analysis and fusion for road area detection," Intelligent Vehicles Symposium, 2008 IEEE , vol., No., pp. 602-607, Jun. 4-6, 2008.*

(Continued)

*Primary Examiner* — Thu Nguyen
*Assistant Examiner* — Angela Widhalm

(57) ABSTRACT

A method for detecting a clear path of travel for a vehicle using an image generated by a camera includes monitoring the image, and utilizing a first patch-based analysis of the image including dividing the image into a plurality of patches, and analyzing each patch to determine a first clear path confidence likelihood for each of the patches of the first patch-based analysis. Each of the patches with the first clear path confidence likelihood greater than a first threshold confidence likelihood is defined as a clear path patch. A second analysis is utilized upon a portion of the patches with the first clear path confidence not greater than the first threshold confidence likelihood to determine a second clear path confidence likelihood for each of the patches of the second analysis. Each of the patches of the second analysis with the second clear path confidence likelihood greater than a second threshold confidence likelihood is defined as a clear path patch. The clear path of travel for the vehicle is identified based upon the clear path patches.

16 Claims, 9 Drawing Sheets

U.S. PATENT DOCUMENTS

| | | | |
|---|---|---|---|
| 7,376,262 B2 | 5/2008 | Hu | |
| 7,397,945 B2* | 7/2008 | Zhang | 382/164 |
| 7,440,585 B2 | 10/2008 | Roh | |
| 7,446,766 B2* | 11/2008 | Moravec | 345/424 |
| 7,636,455 B2* | 12/2009 | Keaton et al. | 382/104 |
| 2003/0081833 A1* | 5/2003 | Tilton | 382/173 |
| 2005/0111730 A1* | 5/2005 | Zhang | 382/173 |
| 2005/0125154 A1* | 6/2005 | Kawasaki | 701/301 |
| 2006/0095207 A1* | 5/2006 | Reid | 701/301 |
| 2006/0213714 A1 | 9/2006 | Igawa | |
| 2009/0268946 A1 | 10/2009 | Zhang et al. | |
| 2009/0268948 A1 | 10/2009 | Zhang et al. | |
| 2009/0295917 A1 | 12/2009 | Zhang et al. | |
| 2010/0013615 A1* | 1/2010 | Hebert et al. | 340/425.5 |
| 2010/0017060 A1 | 1/2010 | Zhang et al. | |
| 2010/0097455 A1 | 4/2010 | Zhang et al. | |
| 2010/0097457 A1 | 4/2010 | Zhang et al. | |
| 2010/0097458 A1 | 4/2010 | Zhang et al. | |
| 2010/0098290 A1 | 4/2010 | Zhang et al. | |
| 2010/0098295 A1 | 4/2010 | Zhang et al. | |
| 2010/0098297 A1 | 4/2010 | Zhang | |
| 2010/0100268 A1 | 4/2010 | Zhang et al. | |
| 2010/0104137 A1 | 4/2010 | Zhang et al. | |
| 2010/0104199 A1 | 4/2010 | Zhang et al. | |
| 2010/0121577 A1 | 5/2010 | Zhang et al. | |
| 2010/0131155 A1* | 5/2010 | Becker et al. | 701/45 |
| 2011/0013837 A1* | 1/2011 | Bergman et al. | 382/173 |

FOREIGN PATENT DOCUMENTS

| | | |
|---|---|---|
| DE | 10 2006 061 390 A1 | 7/2008 |
| JP | 2003189291 A | 7/2003 |
| KR | 1020050069060 A | 7/2005 |
| KR | 1020060021388 A | 3/2006 |
| WO | 2008 071 473 A1 | 6/2008 |

OTHER PUBLICATIONS

Yguel, M.; Aycard, O.; Raulo, D.; Laugier, C.; , "Grid based fusion of off-board cameras," Intelligent Vehicles Symposium, 2006 IEEE , vol., No., pp. 276-281.*

Dongshin Kim; Sang Min Oh; Rehg, J.M.; , "Traversability classification for UGV navigation: a comparison of patch and superpixel representations," Intelligent Robots and Systems, 2007. IROS 2007. IEEE/RSJ International Conference on , vol., No., pp. 3166-3173, Oct. 29, 2007-Nov. 2, 2007.*

Alvarez, J.M.; Lopez, A.; Baldrich, R.; , "Illuminant-invariant model-based road segmentation," Intelligent Vehicles Symposium, 2008 IEEE , vol., No., pp. 1175-1180, Jun. 4-6, 2008.*

15.H. Dahlkamp, A. Kaehler, D. Stavens, S. Thrun, and G. R. Bradski, "Self-supervised Monocular Road Detection in Desert Terrain," in Robotics: Science and Systems, 2006.*

Borenstein, J.; Koren, Y.; , "The vector field histogram-fast obstacle avoidance for mobile robots," Robotics and Automation, IEEE Transactions on , vol. 7, No. 3, pp. 278-288, Jun. 1991.*

Rasmussen, C.; , "Combining laser range, color, and texture cues for autonomous road following," Robotics and Automation, 2002. Proceedings. ICRA '02. IEEE International Conference on , vol. 4, No., pp. 4320-4325 vol. 4, 2002.*

U.S. Appl. No. 61/215,745.

Haar, A., Zur Theorie der orthogonalen Funktionensysteme, Mathematische Annalen, 69, 1910, pp. 331-371.

Burges, C. J.C., A Tutorial on Support Vector Machines for Pattern Recognition, 1998, pp. 1-43, Kluwer Academic Publishers, Boston.

Lucas, Bruce D., "An Iterative Image Registration Techique with an Application to Stereo Vision," Proceedings of Imaging Understanding Workshop, pp. 121-130 (1981).

Harris, Chris, "A Combined Corner and Edge Detector," 1988.

Lowe, David G., "Distinctive Image Features from Scale-Invariant Keypoints," International Journal of Computer Vision, Jan. 5, 2004.

* cited by examiner

CLEAR PATH DETECTION USING A HIERACHICAL APPROACH

CROSS REFERENCE TO RELATED APPLICATIONS

This application is a continuation-in-part of U.S. application Ser. No. 12/474,594 filed on May 29, 2009, which is a continuation-in-part of U.S. application Ser. No. 12/108,581 filed on Apr. 24, 2008. U.S. application Ser. No. 12/474,594 and U.S. application Ser. No. 12/108,581 are incorporated herein by reference.

TECHNICAL FIELD

This disclosure is related to automated or semi-automated control of a motor vehicle.

BACKGROUND

The statements in this section merely provide background information related to the present disclosure and may not constitute prior art.

Autonomous driving systems and semi-autonomous driving systems utilize inputs regarding the road and other driving conditions to automatically control throttle and steering mechanisms. Accurate estimation and identification of a clear path over which to operate a motor vehicle is critical to successfully replacing the human mind as a control mechanism for vehicle operation.

Road conditions can be complex. Under normal operation of a vehicle, the human operator makes hundreds of observations per minute and adjusts operation of the vehicle on the basis of perceived road conditions. One aspect of perceiving road conditions is the perception of the road in the context of objects in and around the roadway and navigating a clear path through any objects. Replacing human perception with technology preferentially includes some means to accurately perceive objects, for example, including stationary objects such as roadside curbs and moving objects such as other vehicles, and road conditions, such as lane markers, potholes, or icy patches upon the roadway, and continue to effectively navigate around such navigational concerns.

Technological means for perceiving an object or road conditions include data from visual cameras, radar imaging, and LIDAR. Cameras translate visual images in the form of radiation such as light patterns or infrared signatures into a readable data format. One such data format includes pixelated images, in which a perceived scene is broken down into a series of pixels. Radar imaging utilizes radio waves generated by a transmitter to estimate shapes and objects present in front of the transmitter. Patterns in the waves reflecting off these shapes and objects can be analyzed and the locations of objects can be estimated. Similarly, LIDAR utilizes a light source and returns of the light from the environment of the vehicle to generate information on the environment.

Once data has been generated regarding the ground in front of the vehicle, the data must be analyzed to estimate the presence of objects or road conditions from the data. By using cameras, radar imaging systems, and LIDAR, ground or roadway in front of the vehicle can be analyzed for the presence of objects or road conditions that might need to be avoided. However, the mere identification of potential navigational concerns to be avoided does not complete the analysis. An important component of any autonomous system includes how potential navigational concerns identified in perceived ground data are processed and manipulated to identify a clear path in which to operate the vehicle.

One known method to identify a clear path in which to operate the vehicle is to catalog and provisionally identify all perceived navigational concerns and identify a clear path in light of the locations and behaviors of identified concerns. Images may be processed to identify and classify navigational concerns according to their form and relationship to the roadway. While this method can be effective in identifying a clear path, it requires a great deal of processing power, for example, requiring the recognition and separation of different objects in the visual image, for instance, distinguishing between a tree along the side of the road and a pedestrian walking toward the curb. Such methods can be slow or ineffective to process complex situations or may require bulky and expensive equipment to supply the necessary processing capacity.

SUMMARY

A method for detecting a clear path of travel for a vehicle using an image generated by a camera includes monitoring the image, and utilizing a first patch-based analysis of the image including dividing the image into a plurality of patches, and analyzing each patch to determine a first clear path confidence likelihood for each of the patches of the first patch-based analysis. Each of the patches with the first clear path confidence likelihood greater than a first threshold confidence likelihood is defined as a clear path patch. A second analysis is utilized upon a portion of the patches with the first clear path confidence not greater than the first threshold confidence likelihood to determine a second clear path confidence likelihood for each of the patches of the second analysis. Each of the patches of the second analysis with the second clear path confidence likelihood greater than a second threshold confidence likelihood is defined as a clear path patch. The clear path of travel for the vehicle is identified based upon the clear path patches.

BRIEF DESCRIPTION OF THE DRAWINGS

One or more embodiments will now be described, by way of example, with reference to the accompanying drawings, in which.

DETAILED DESCRIPTION

Figure 1:
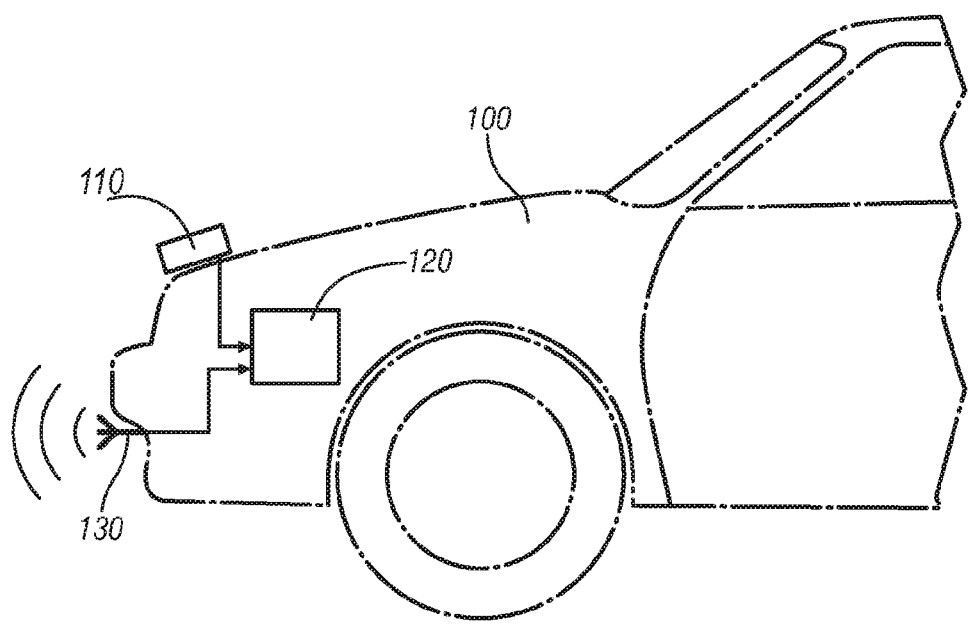
FIG. 1 illustrates an exemplary arrangement of a vehicle equipped with a camera and a radar imaging system in accordance with the disclosure.

Referring now to the drawings, wherein the showings are for the purpose of illustrating certain exemplary embodiments only and not for the purpose of limiting the same, FIG. 1 illustrates an exemplary arrangement of camera 110 located on the front of a vehicle 100 and pointed toward the ground in front of the vehicle 100 in accordance with the disclosure. Camera 110 is in communication with processing module 120 containing logic to process inputs from camera 110. The vehicle 100 may also be equipped with a radar imaging system 130, which, when present, is also in communication with processing module 120. It should be appreciated by those having ordinary skill in the art that the vehicle 100 could utilize a number of methods to identify road conditions in addition or in the alternative to the use of camera 110 and the radar imaging system 130, including LIDAR, GPS information in combination with a digital map, information from other vehicles in communication with the vehicle 100, information from an infrastructure device communicated to the vehicle 100, historical data concerning the particular roadway, biometric information such as systems reading the visual focus of the driver, or other similar systems. The disclosure herein can be applied to various device arrangements and is therefore not limited thereby.

The camera 110 is a device well known in the art capable of translating visual inputs in the form of light, infrared, or other electro-magnetic (EM) radiation into a data format readily capable of analysis, e.g., a digital, pixelated image. In one embodiment, the camera 110 uses a charge coupled device (CCD) sensor to generate images indicating a field-of-view. Preferably, the camera 110 is configured for continuous image generation, e.g., 30 images generated per second. Images generated by the camera 110 may be stored in memory within the camera 110 or transferred to the processing module 120 for storage and/or analysis. Preferably, each image generated by the camera 110 is a two-dimensional image of known pixel dimensions comprising a plurality of identifiable pixels. The plurality of identifiable pixels may be stored and analyzed using an array. Each pixel may be represented in the array as a set of bits or a plurality of sets of bits wherein the bits correspond to a color on a predetermined palette or color map. Each pixel may be expressed as a function of a plurality of color intensity values such as in a red-green-blue (RGB) color model or a cyan-magenta-yellow-key (CMYK) color model. Preferably, each pixel comprises a plurality of sets of bits wherein each set of bits corresponds to a color intensity and a color intensity value e.g., a first set of bits corresponds to a red color intensity value, a second set of bits corresponds to a green color intensity value, and a third set of bits corresponds to blue color intensity value on the RGB color model.

The radar imaging device 130 is a device well known in the art incorporating a transmitter capable of emitting radio waves or other EM radiation, a receiver device capable of sensing the emitted waves reflected back to the receiver from objects in front of the transmitter, and means to transfer the sensed waves into a data format capable of analysis, indicating for example range and angle from the objects off which the waves reflected. Alternatively, the radar imaging device 130 may be replaced or supplemented with a light detection and ranging (LIDAR) system configured to transmit and receive optical energy. The received optical energy may be used to determine object geometric dimensions and/or geometrical proximity to the vehicle 100. It will be noted that radar imaging device 130 is optional and unnecessary to perform many of the methods disclosed herein, wherein processing of visual images is capable of accomplishing clear path detection. The term "clear path" as used herein is to be given its ordinary and customary meaning to a person of ordinary skill in the art (and it is not to be limited to a special or customized meaning), and refers without limitation to a path free of objects exceeding a threshold.

The processing module 120 is illustrated in FIG. 1, and described herein as a discrete element. Such illustration is for ease of description and it should be recognized that the functions performed by this element may be combined in one or more devices, e.g., implemented in software, hardware, and/or application-specific integrated circuitry. The processing module 120 can be a general-purpose digital computer comprising a microprocessor or central processing unit, storage mediums comprising non-volatile memory including read only memory and electrically programmable read only memory, random access memory, a high speed clock, analog to digital and digital to analog circuitry, and input/output circuitry and devices and appropriate signal conditioning and buffer circuitry. In the alternative, processing module 120 can be a digital signal processing (DSP) unit, such as a customized integrated circuit such as a field programmable gate array. The processing module 120 has a set of processing algorithms, comprising resident program instructions and calibrations stored in the non-volatile memory and executed to provide desired functions. The algorithms are preferably executed during preset loop cycles. Algorithms are executed by the central processing unit and are operable to monitor inputs from the aforementioned sensing devices and execute control and diagnostic routines to control operation of the actuators, using preset calibrations. Loop cycles may be executed at regular intervals, for example each 3.125, 6.25, 12.5, 25 and 100 milliseconds during ongoing engine and vehicle operation. Alternatively, algorithms may be executed in response to occurrence of an event.

The processing module 120 executes algorithmic code stored therein to monitor related equipment such as camera 110 and radar imaging system 130 and execute commands or data transfers as indicated by analysis performed within the processing module. Processing module 120 may include algorithms and mechanisms to actuate autonomous driving control by means known in the art and not described herein, or processing module 120 may simply provide information to a separate autonomous driving system. Processing module 120 is adapted to receive input signals from other systems and the operator as necessary depending upon the exact embodiment utilized in conjunction with the control module.

Figure 2:
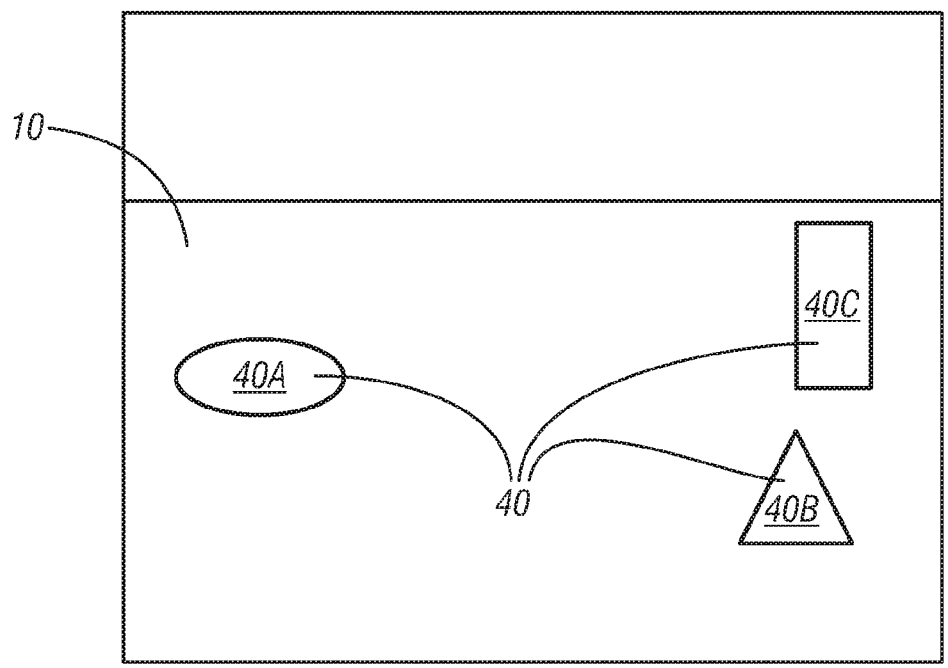
FIG. 2 illustrates a known method to determine a clear path for autonomous driving in accordance with the disclosure.

FIG. 2 illustrates a known method to determine a clear path for autonomous driving in accordance with the disclosure. Image 10 is generated corresponding to the roadway in front of vehicle 100. Through one of various methods, objects 40A, 40B, and 40C are identified within image 10, and each object is categorized and classified according to filtering and trained object behaviors. Separate treatment of each object can be computationally intensive, and requires expensive and bulky equipment to handle the computational load. An algorithm processes all available information regarding the roadway and objects 40 to estimate a clear path available to vehicle 100. Determination of the clear path depends upon the particular classifications and behaviors of the identified objects 40.

Figure 3:
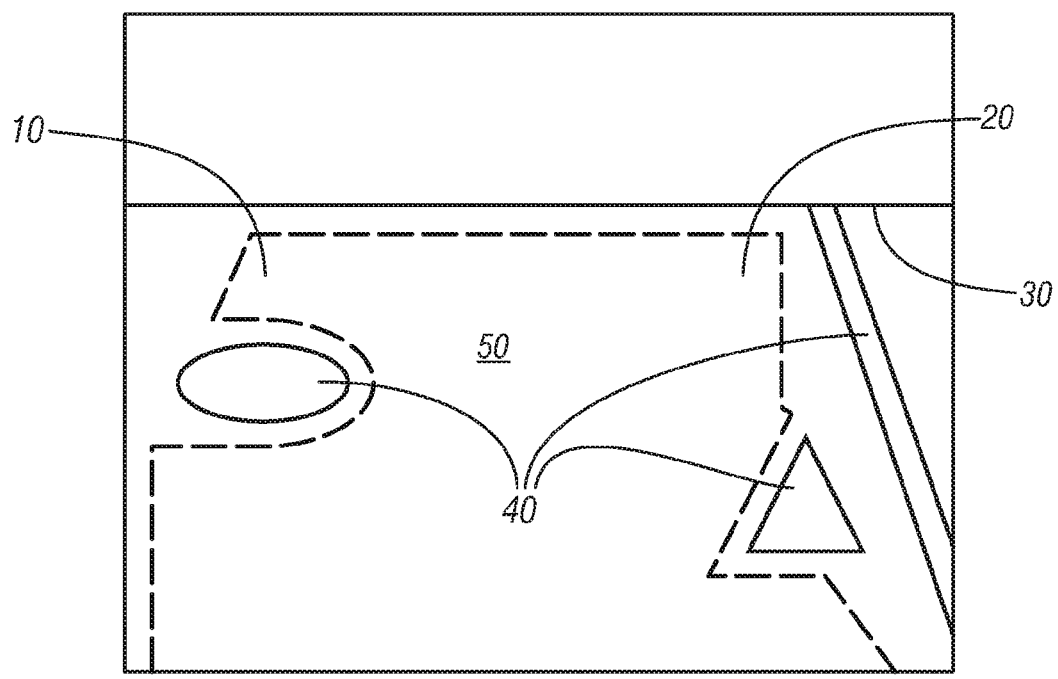
FIG. 3 illustrates an exemplary method to determine a clear path utilizing a likelihood analysis of an image in accordance with the disclosure.

FIG. 3 illustrates an exemplary method to determine a clear path for autonomous or semi-autonomous driving in accordance with the disclosure. Image 10 is depicted including ground 20, horizon 30, and objects 40. Image 10 is collected by camera 110 and represents the road environment in front of vehicle 100. Ground 20 represents the zone of all available paths open to travel without regard to any potential objects. The method of FIG. 3 that determines a clear path upon ground 20 starts by presuming all of ground 20 is clear, and then utilizes available data to disqualify portions of ground 20 as not clear. In contrast to the method of FIG. 2 which classifies every object 40, the method of FIG. 3 instead analyzes ground 20 and seeks to define a clear path confidence likelihood from available data that some detectable anomaly which may represent object 40 limits or makes not clear that portion of ground 20. This focus upon ground 20 instead of objects 40 avoids the complex computational tasks associated with managing the detection of the objects. Individual classification and tracking of individual objects is unnecessary, as individual objects 40 are simply grouped together as a part of the overall uniform limitation upon ground 20. Ground 20, described above as all paths open to travel without discrimination, minus limits placed on ground 20 by areas found to be not clear, define clear path 50, depicted in FIG. 3 as the area within the dotted lines, or an area with some threshold confidence likelihood of being open for travel of vehicle 100.

Object 40 that creates not clear limitations upon ground 20 can take many forms. For example, an object 40 can represent a discrete object such as a parked car, a pedestrian, or a road obstacle, or object 40 can also represent a less discreet change to surface patterns indicating an edge to a road, such as a road-side curb, a grass line, or water covering the roadway. Object 40 can also include an absence of flat road associated with ground 20, for instance, as might be detected with a large hole in the road. Object 40 can additionally include an indicator without any definable change in height from the road, but with distinct clear path implications for that segment of road, such as a paint pattern on the roadway indicative of a lane marker. The method disclosed herein, by not seeking to identify object 40 but by taking visual cues from ground 20 and anything in proximity to the ground in image 10, evaluates a clear path confidence likelihood of clear versus not clear and adjusts the control of vehicle 100 for the presence of any object 40.

Figure 4:
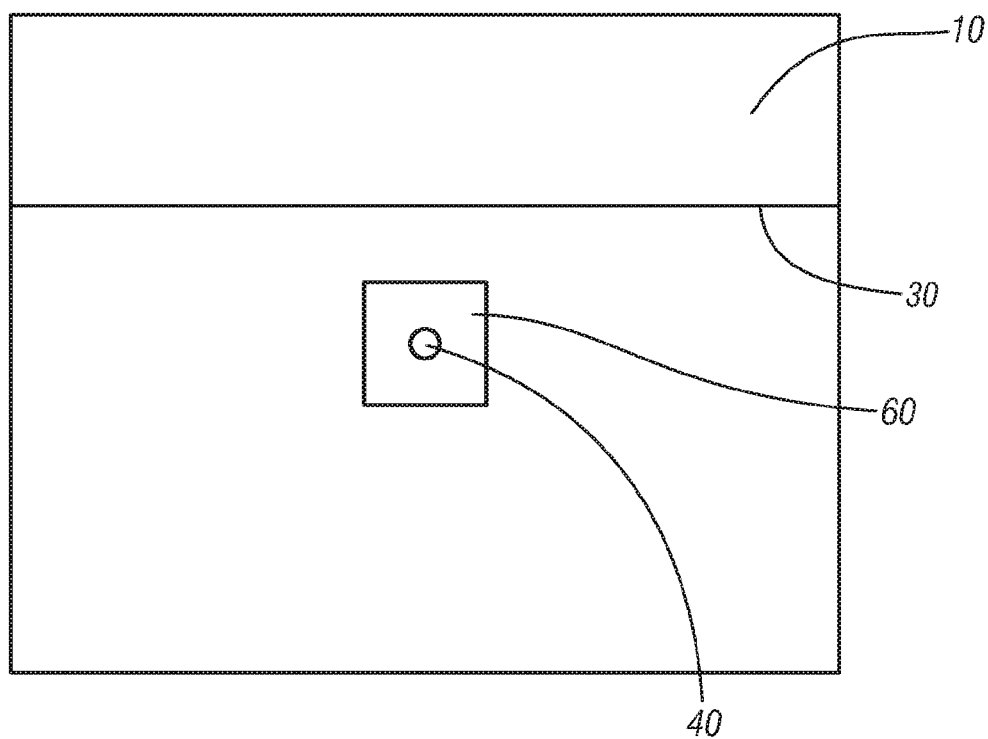
FIG. 4 illustrates an exemplary method to analyze an image in accordance with the disclosure.

Numerous methods for automated analysis of two-dimensional (2D) images are possible. Analysis of image 10 is performed by an algorithm within processing module 120. FIG. 4 illustrates one exemplary method which may be applied to analyze image 10 in accordance with the disclosure. This method subdivides image 10 and identifies a sub-image or patch 60 of ground 20 for analysis, extracts features or analyzes the available visual information from patch 60 to identify any interesting or distinguishing features within the patch, and classifies the patch according to a confidence likelihood of being a clear path according to analysis of the features. Patches with greater than a certain threshold of likeliness are classified as clear, and a compilation of patches can be used to assemble a clear path within the image.

Patch 60, as a sub-image of image 10, can be identified through any known means, such as random search or swarm search of image 10. Alternatively, information regarding the presence of an object 40 available from some other source of information, such as radar imaging system 130, can be used to identify a patch to analyze the portion of image 10 which should describe object 40. Image 10 may require many patches 60 to analyze the whole image. In addition, multiple overlaying patches or patches of different size could be used to fully analyze a region of image 10 containing information of interest. For instance, a small patch 60 might be used to analyze a small dot on the road; however, a large patch 60 might be required to analyze a series of dots which in isolation might seem uninteresting, but in context of the entire series, could indicate an object 40 of interest. In addition, the resolution of patches applied to a particular area may be modulated based upon information available, for instance, with more patches being applied to a region of image 10 wherein an object 40 is thought to exist. Many schemes or strategies can be utilized to define patches 60 for analysis, and the disclosure is not intended to be limited to the specific embodiments described herein.

Once a patch 60 has been identified for analysis, processing module 120 processes the patch by applying known feature identification algorithms to the patch. Additionally, processing module 120 may perform analysis of the location of the patch in context to the location of the vehicle. Feature identification algorithms search available visual information for characteristic patterns in the image associated with an object including features defined by line orientation, line location, color, corner characteristics, other visual attributes, and learned attributes. Feature identification algorithms may be applied to sequential images to identify changes corresponding to vehicle motion, wherein changes not associated with ground movement may be identified not clear path. Learned attributes may be learned by machine learning algorithms within the vehicle, but are most frequently programmed offline and may be developed experimentally, empirically, predicatively, through modeling or other techniques adequate to accurately train distinguishing attributes.

Once features in patch 60 have been extracted, the patch is classified on the basis of the features to determine the confidence likelihood that the patch is a clear path. Likelihood analysis is a process known in the art by which a likelihood value or a confidence is developed that a particular condition exists. Applied to the present disclosure, classification includes likelihood analysis to determine whether the patch represents a clear path or if ground 20 in this patch is limited by an object 40. Classification is performed in an exemplary embodiment by application of classifiers or algorithms trained with a database of exemplary road conditions and interactions with detected objects. These classifiers allow processing module 120 to develop a fractional clear path likelihood value for patch 60, quantifying a confidence between zero and one that the features identified within the patch do not indicate a limiting object 40 which would inhibit free travel of vehicle 100. A threshold confidence can be set, defining the clear path likelihood required to define the patch as a clear path, for instance by the following logic.

$$\text{Confidence} = \text{ClearPathLikelihood}(i)$$

$$\text{If\_Confidence} > 0.5, \text{then\_patch} = \text{clearpath} \qquad (1)$$

In this particular exemplary embodiment, a confidence of 50% or 0.5 is selected as the threshold confidence. This number can be developed experimentally, empirically, predicatively, through modeling or other techniques adequate to accurately evaluate patches for clear path characteristics.

Figure 5:
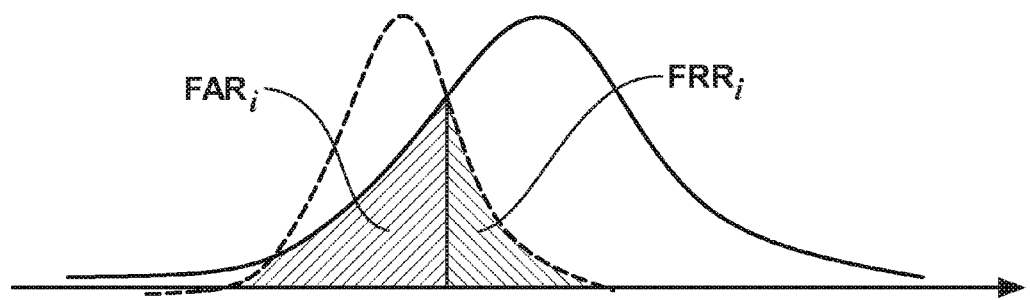
FIG. 5 illustrates an exemplary method to define a classification error by tuning a single threshold in accordance with the disclosure.

The likelihood analysis, as mentioned above, may be performed in one exemplary embodiment by application of trained classifiers to features extracted from a patch. One method analyzes the features a-priori using a training set of images. In this training stage, distinguishing features are selected from a raw feature set, the distinguishing features being defined by methods known in the art, such as Haar wavelet, Gabor wavelet, and Leung-and-Malik filter bank. In addition, 2D image location information based on each feature's minimal classification errors, calculated as the sum of false acceptance rate (FAR) and false rejection rate (FRR), may be utilized by tuning a single threshold as illustrated in FIG. 5. This classification error can be described through the following expression.

$$\text{ClassificationError}(i) = FAR_i + FRR_i \quad (2)$$

Information from the trained classifiers is used to classify or weight the feature as indicating a clear path or not clear path, the particular classification depending upon the strength of comparisons to the trained data. Classification of the feature, if the feature is the only feature within the patch, may be directly applied to the patch. Classification of a patch with multiple features identified may take many forms, including the patch being defined by the included feature most indicative of the patch being not clear or the patch being defined by a weighted sum of all of the features included therein.

The above method can be utilized to examine an individual image 10 and estimate a clear path 50 based upon visual information contained within image 10. This method may be repeated at some interval as the vehicle travels down the road to take new information into account and extend the formulated clear path to some range in front of the vehicle's new position. Selection of the interval must update image 10 with enough frequency to accurately supply vehicle 100 with a clear path in which to drive. However, the interval can also be selected to some minimum value to adequately control the vehicle but also not to unduly burden the computational load placed upon processing module 120.

Clear path detection can be accomplished through a single image 10 as described above. However, processing speed and accuracy can be improved with the addition of a second image taken in close time proximity to the original image, such as sequential images from a streaming video clip. A second image allows direct comparison to the first and provides for updated information regarding progression of the vehicle and movement of detected objects. Also, the change of perspective of camera 110 allows for different analysis of features from the first image: a feature that may not have shown up clearly or was indistinct in the first image may display at a different camera angle, stand out more distinctly, or may have moved since the first image, allowing the classification algorithm an additional opportunity to define the feature.

Processing of a second image in relation to the original image 10 can be performed by calculating an image difference. If the image difference of a point of interest, such as a feature identified by radar, is not zero, then the point can be identified as embodying new information. Points where the image difference does equal zero can be eliminated from analysis and computation resources may be conserved. Methods to determine image difference include absolute image intensity difference and vehicle-motion compensated image difference.

Determining an image difference by calculating an absolute image intensity difference can be used to gather information between two images. One method of absolute image intensity difference includes determining equivalent image characteristics between the original image and the second image in order to compensate for movement in the vehicle between the images, overlaying the images, and noting any significant change in intensity between the images. A comparison between the images indicating a change in image intensity in a certain area contains new information. Areas or patches displaying no change in intensity can be de-emphasized in analysis, whereas areas displaying clear changes in intensity can be focused upon, utilizing aforementioned methods to analyze patches on either or both captured images.

Figure 6A:
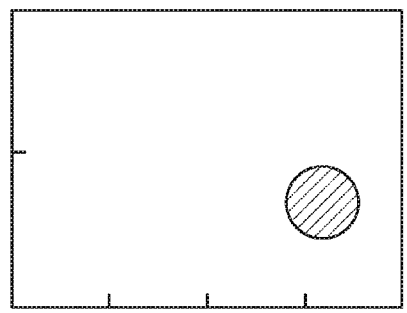
FIGS. 6A, 6B, and 6C illustrate an exemplary determination of an image difference by calculating an absolute image intensity difference in accordance with the disclosure.
Figure 6B:
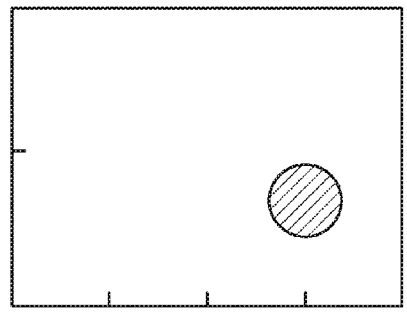
Figure 6C:
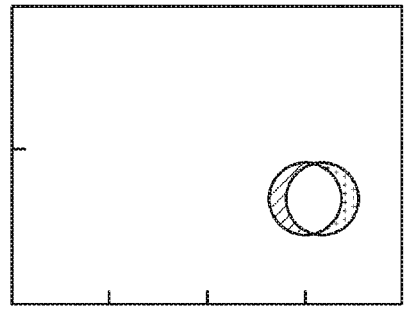

FIGS. 6A, 6B, and 6C illustrate an exemplary determination of an image difference by calculating an absolute image intensity difference in accordance with the disclosure. FIG. 6A depicts an original image. FIG. 6B depicts a second image with changes from the original image. In particular the depicted circular shape has shifted to the left. A comparison of the two images as illustrated in FIG. 6C, an output representing the result of an absolute image intensity difference comparison, identifies one region having gotten darker from the first image to the second image and another region having gotten lighter from the first image to the second image. Such a method can be described as differencing. Analysis of the comparison yields information that some change as a result of movement or change of perspective is likely available in that region of the images. In this way, absolute image intensity difference can be used to analyze a pair of sequential images to identify a potentially not clear path.

Likewise, determining an image difference by calculating a vehicle-motion compensated image difference can be used to gather information between two images. Many methods to calculate a vehicle-motion compensated image difference are known. One exemplary method of vehicle-motion compensated image difference includes analyzing a potential object as both a stationary portion of a clear path and a detected object at the same time. Likelihood analysis is performed on features identified corresponding to the potential object from both classifications at the same time, and the classifications may be compared, for example, through the following logic.

$$\text{Confidence}(i) = \text{ClearPathLikelihood}(i) - \text{DetectedObjectLikelihood}(i)$$

$$\text{If\_Confidence} > 0, \text{then\_patch} = \text{clearpath} \quad (3)$$

In this exemplary comparison, if confidence(i) is greater than zero, then the patch containing the feature is classified as a clear path. If confidence(i) equals or is less than zero, then the patch containing the feature is classified as not a clear path or limited. However, different values may be selected for the confidence level to classify the patch as a clear path. For example, testing may show that false positives are more likely than false negatives, so some factor or offset can be introduced.

Figure 7:
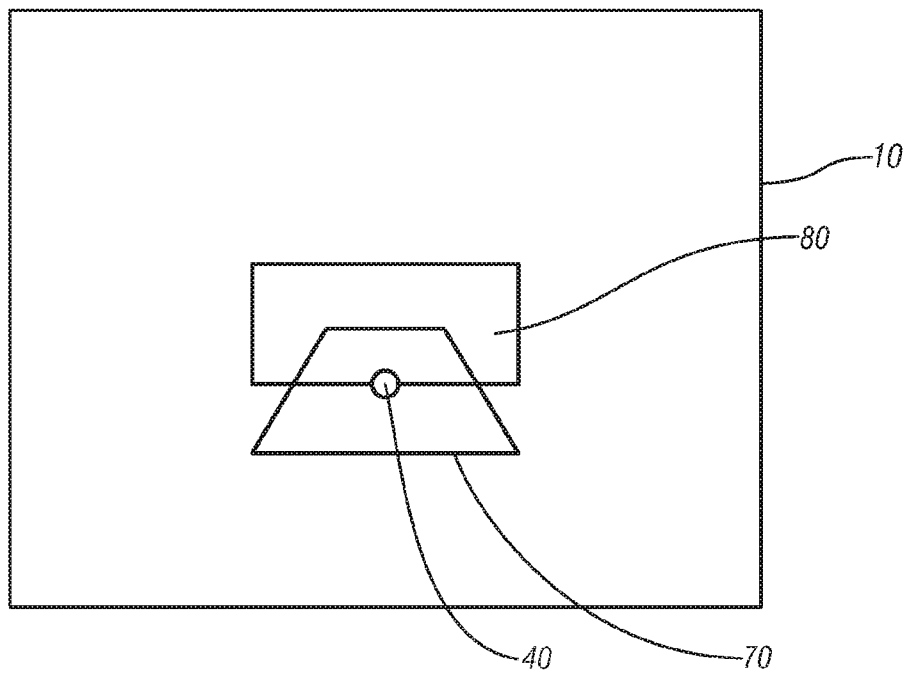
FIG. 7 illustrates an exemplary method to classify a feature as a portion of a clear path and as a detected object at the same time as a method of image analysis in accordance with the disclosure.
Figure 8:
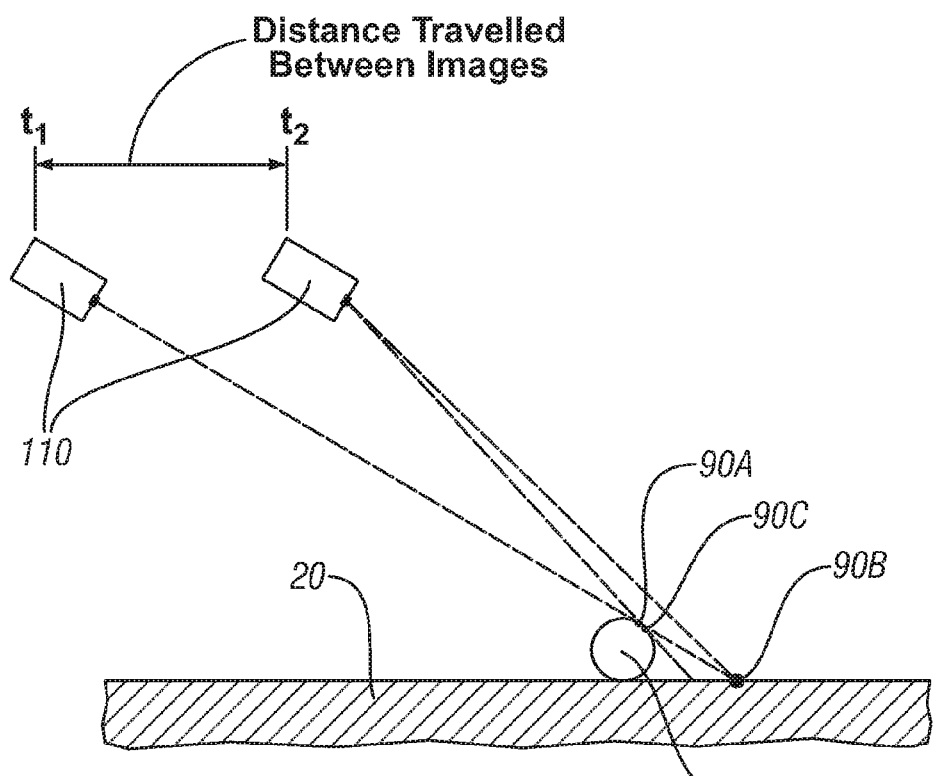
FIG. 8 further illustrates an exemplary method to classify a feature as a portion of a clear path and as a detected object at the same time as a method of image analysis in accordance with the disclosure.

FIG. 7 illustrates one method to classify a feature as a portion of a clear path and as a detected object at the same time as described above in accordance with the disclosure. Image 10 includes object 40, trapezoidal projection 70, and rectangular projection 80. This method utilizes an assumption projecting object 40 as a flat object on the ground within projection 70 to test the classification of the feature as a portion of a clear path. The method also utilized an assumption projecting object 40 as a vertical object within rectangular projection 80 to test the classification of the feature as a detected object. FIG. 8 illustrates comparisons made in data collected between the two images to evaluate the nature of object 40 in accordance with the disclosure. Camera 110 at time $t_1$ observes and captures data from object 40 in the form of a first image. If object 40 is an actual detected object, the profile observed by camera 110 of object 40 at time $t_1$ will correspond to point 90A. If object 40 is a flat object in the same plane as ground 20, then the profile observed by camera 110 of object 40 at time $t_1$ will correspond to point 90B. Between times $t_1$ and $t_2$, camera 110 travels some distance. A second image is captured at time t2, and information regarding object 40 can be tested by applying an algorithm looking at visible attributes of the object in the second image in comparison to the first image. If object 40 is an actual detected object, extending upward from ground 20, then the profile of object 40 at time $t_2$ will be observed at point 90C. If object 40 is a flat object in the same plane as ground 20, then the profile of object 40 at time t2 will be observed at point 90B. The comparison derived through vehicle-motion compensated image difference can directly assign a confidence by application of classifiers based on the observations of points 90, or the comparison may simply point to the area displaying change as a point of interest. Testing of the object against both classifications, as a flat object and as an actual detected object, allows either the area including object 40 to be identified for further analysis through analysis of a patch as described above or direct development of a clear path likelihood and a detected object likelihood for comparison, for example as in logic expression (3) above.

Information available from analysis of the second image can additionally be improved by integration of information regarding movement of the vehicle, such as speed and yaw-rate. Information regarding vehicle motion is available from a number of sources, including the vehicle speedometer, vehicle dynamic sensors or wheel speed sensors, anti-lock braking mechanisms, and GPS location systems. Algorithms may utilize this vehicle movement information, for example, in conjunction with the projections described in FIGS. 7 and 8 to project angles which should exist in a feature laying flat on the ground in the second image based upon data from the first image and the measured movement of the vehicle between the images.

The number of images utilized for comparison need not be limited to two. Multiple image analysis can be performed at multiple iterations, with an object being tracked and compared over a number of cycles. As mentioned above, computational efficiency can be gained by utilizing image difference analysis to identify points of interest and eliminating areas with zero difference from subsequent analyses. Such efficiencies can be used in multiple iterations, for example, saying that only points of interest identified between a first and second image will be analyzed in the third and fourth images taken. At some point, a fresh set of images will need to be compared to ensure that none of the areas showing zero difference have had any change, for example a moving object impinging upon a previously identified clear path. The utilization of image difference analyses and of focused analyses, eliminating areas identified with zero change, will vary from application to application and may vary between different operating conditions, such as vehicle speed or perceived operating environment. The particular utilization of image difference analyses and of focused analyses can take many different embodiments, and the disclosure is not intended to be limited to the specific embodiments described herein.

Multiple methods are disclosed herein for identifying a clear path including patch-based methods and pixel-based methods. These methods are preferably executed in the processing module 120, but may be combined in one or more devices, e.g., implemented in software, hardware, and/or application-specific integrated circuitry. Patch-based methods are described above and herein with reference to FIGS. 9 and 10. Pixel-based methods are described herein with reference to FIGS. 11 and 12. Exemplary pixel-based methods include textureless and texture-rich methods. Texture-rich methods analyze pixelated features in an image for distinct interest points based upon a contextual view within the image. The interest points are mapped corresponding to a field-of-view from the vehicle 100 and a clear path is determined based upon topography of the interest points within the map. Textureless methods filter from an image non-conforming regions of the image as not belonging to a planar, consistent road surface; remaining pixels correspond to the clear path. As described hereinabove, patch-based methods are computationally relatively fast, while pixel-based methods are computationally relatively slow.

Figure 9:
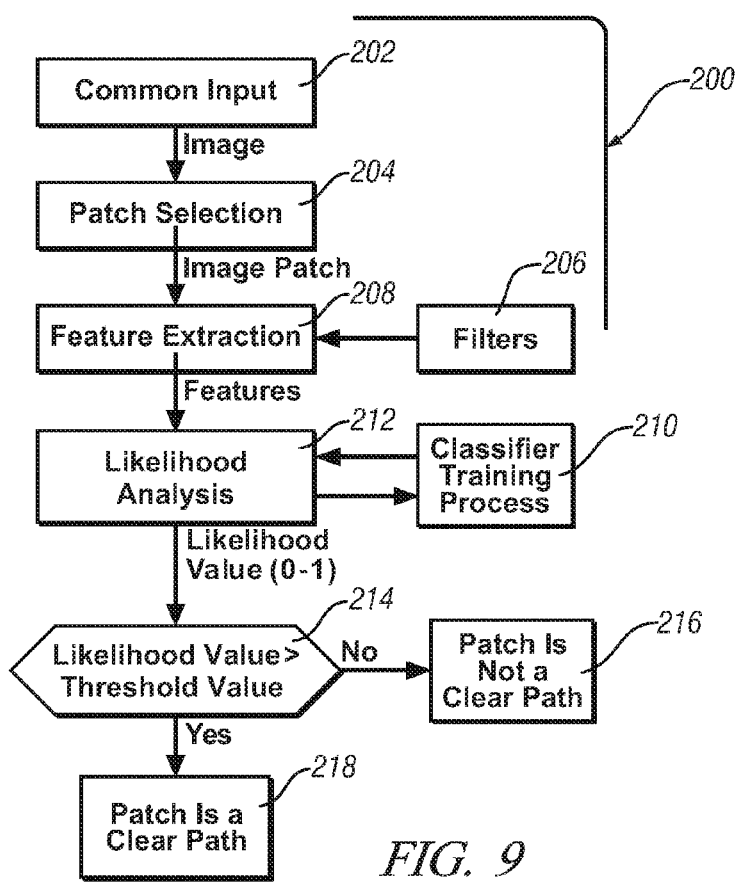
FIG. 9 is a flowchart for an exemplary patch-based method for detecting a clear path in accordance with the disclosure.

FIG. 9 illustrates an exemplary patch-based method 200 wherein input from a camera is analyzed to determine a clear path likelihood in accordance with the disclosure. The patch-based method 200 is illustrated in FIG. 9, and described herein as comprising discrete elements. Such illustration is for ease of description and it should be recognized that the functions performed by these elements may be combined in one or more devices, e.g., implemented in software, hardware, and/or application-specific integrated circuitry. For example, the patch-based method 200 may be executed as one or more algorithms in the processing module 120.

During operation, the camera 110 generates an image for analysis in the processing module 120 (202). The processing module 120 identifies patches in the image and selects a patch for analysis (204). Multiple methods for defining a plurality of patches sufficient to adequately analyze the image are contemplated by this disclosure. As described above, patches may be defined according to random search or swarm search methods. Alternatively, information from some other source of information, such as a radar imaging system or LIDAR, can be used to define a patch to analyze the portion of the image. In addition, multiple overlaying patches can be utilized based upon the perceived area of interest upon the image to be analyzed. Additionally, methods can be utilized to define patches according to anticipated road surface in front of the vehicle and resulting clear path patterns, for example, including a fixed-grid patch method, sectioning off some or all of the image according to a regular patch pattern, and a perspective patch method, similar to the fixed-grid patch method except that the patch sizes and/or shapes are modulated based upon a perspective view of the road and consideration for an amount of road surface contained within each of the patches. Such an anticipated road surface in front of the vehicle can be adjudged by an initial review of the input image, for example, utilizing clearly visible lines that could define lane boundaries as an initial reference to define a patch pattern. In another example, a patch pattern from an immediately previous iteration of the clear path method could be utilized and slowly modulated through the iterations, based upon the iteratively defined clear path and other indications that can be identified within the analyzed images.

The fixed-grid patch method identifies and divides the image into a plurality of patches based upon an area of interest and applies a fixed-grid pattern to the area of interest. The fixed-grid pattern sections substantially the entire area of interest in patches. The area of interest preferably encompasses the field-of-view immediately in front of the vehicle, however the area may be defined to encompasses more narrow fields-of-view. In one embodiment, the area of interest encompasses the field-of-view immediately in front of the vehicle and delimited by a horizon line or a vanishing point perceived for the roadway. The fixed-grid patch method can include patch tracking, identification, and analysis via a matrix, wherein each patch may be identified by a number of a number series.

The fixed-grid patch may be applied to the image using a number of methods. A first method includes applying the fixed-grid patch to sequential images using equal image coordinates. A second method includes applying the fixed-grid patch to the image using an identified interest point on the image, e.g., the horizon line. A third method includes applying the fixed-grid patch to the image compensating for vehicle movement, e.g., vehicle yaw.

The perspective patch method identifies and divides the image into a plurality of patches based upon field-of-view coordinates rather than image coordinates. An area of interest is identified as described hereinabove, wherein a perspective patch pattern is applied to the area of interest based upon estimated field-of-view coordinates, allocating patch size relative to an approximate area of ground covered by each patch. Such perspective patch definitions allow for a more detailed review of patches describing ground closer to the vehicle and less wasteful review of patches describing ground more distant from the vehicle. Patches can be aligned to the perceived lanes of travel upon the roadway, for example, as defined by lane markers and/or curbsides. Such patch definitions will frequently be trapezoidal, with the parallel sides of the trapezoids being parallel to the horizon or horizontal axis of the vehicle, and with the remaining sides of the trapezoids being dependent upon the defined road surface in the image view. Such a patch alignment is efficient to defining the road surface. However, computation of the grid of patches and the analysis of the patches is complicated by the many different shapes. The patches can instead be normalized to rectangle (or square) shapes, still parallel to the horizon or horizontal axis of the vehicle. Such rectangular patches are in ways less efficient in covering the road surface, for example, with portions of the curbside overlapping patches including actually clear roadway, but sufficient resolution of the patches and improved the computational efficiency can make such normalized perspective patches beneficial.

Figure 10:
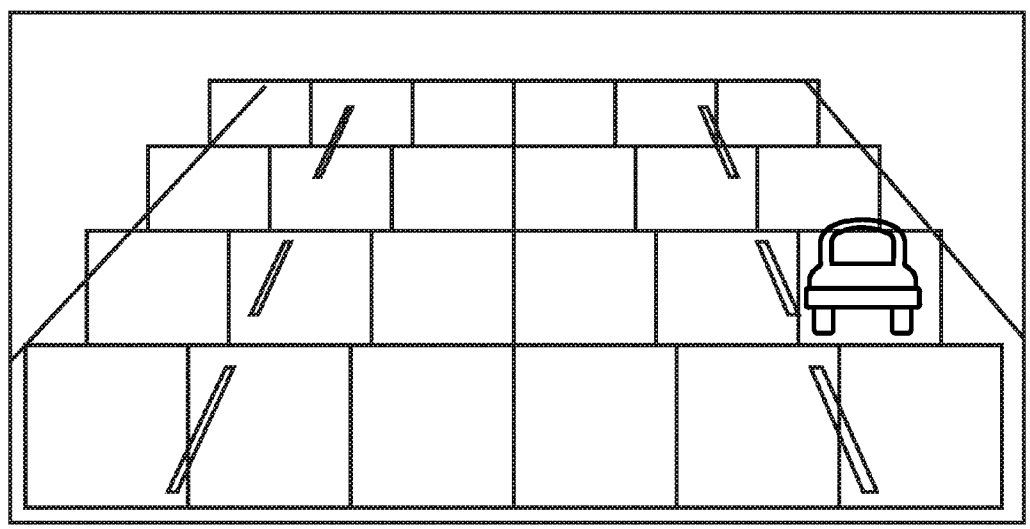
FIG. 10 graphically illustrates an exemplary plurality of perspective patches as applied to an exemplary image, in accordance with the disclosure.

FIG. 10 graphically illustrates an exemplary plurality of normalized perspective patches as applied to an exemplary image. The perspective patches vary in size based upon geographic area associated with the perspective patch. As FIG. 10 shows, patches associated with a geographical area in close proximity to the vehicle are larger in size than patches associated with the geographical area further away from the vehicle. Defining patches on an image according to geographical area allocates processing resources for the patches based upon geographical area, thereby increasing object detection capabilities for objects in proximity to the vehicle where time for driving decisions is more limited.

Returning to FIG. 9, a filter or a set of filters may be applied to the selected patch (206), e.g., a lighting normalization filter. An exemplary normalization filter changes the range of pixel intensity values within the patch, thereby bringing the patch into a range that is more suitable for machine processes. For example, normalizing each pixel value to a zero mean and unit variance enhances the image contrast, specifically in a low lighting environments or when contrast is poor due to glare. A number of exemplary filters and filtering methods useful for image analysis are envisioned, and the disclosure is not intended to be limited to the particular exemplary embodiments described herein.

After filtering, feature extraction is executed on the selected patch using feature extraction algorithms (208). Feature extraction algorithms may analyze the selected patch for predetermined features, e.g., edges, corners, and blobs, and/or shapes, e.g., circles, ellipses, and lines. It will be appreciated that some features have meaning and others do not, and a process of feature selection can be utilized to identify a group of best features for analysis. A classifier training algorithm analyzes each feature and assigns a likelihood value (210). As mentioned above, classifiers or logic used in developing likelihood values are initially trained offline. Training may optionally be continued in the vehicle based upon fuzzy logic, neural networks, or other learning mechanisms known in the art. These trained classifiers perform a likelihood analysis upon the features extracted, and a likelihood value for the patch is determined. This likelihood value expresses a confidence that the selected patch is clear.

The likelihood analysis may be augmented using spatially and/or temporally related patches to evaluate identified features during vehicle operation. When the feature extraction algorithm has identified a feature, the processing module 120 may spatially analyze the identified feature for consistency among adjacent or nearby patches. A feature identified in one patch may be compared to surrounding patches to determine if it is an aberration or consistent with the surrounding patches. A feature that is consistent with surrounding patches may be assigned a similar likelihood value to the surrounding patches, whereas a feature not consistent with surrounding patches can be assigned a different likelihood value. Similarly to the spatial analysis, when the feature extraction algorithm has identified a feature, the processing module 120 may temporally analyze the identified feature for consistency among temporally related patches, compensating for vehicle motion. For example, a feature analyzed in several frames and determined to have a high likelihood value through the image frames can be temporally compared to the same feature receiving a low likelihood value in a later frame. If the temporal analysis of the feature reveals new information, such as movement of the feature with respect to the roadway or increased perspective revealing the feature to be indicative of an object situated upon the road surface, then the lower likelihood value for the feature can be confirmed. If no new information is available, then the lower likelihood value for the feature in the present frame can be suspended as not necessarily indicating a not clear path. Subsequent frames can be analyzed similarly to establish the feature as significant or not. Similarly, according to methods described herein, the questionable feature can be analyzed with increased computational emphasis, either in the present image or in subsequent images.

The processing module 120 compares the likelihood value to a threshold likelihood value (214). If the likelihood value is greater than the threshold value, then the patch is identified as a clear path (218). If the likelihood value is not greater than the threshold value, then the patch is identified as a not clear path.

As described above, the patch-based method 200 may be repeated or reiterated in a number of ways, with the same image being analyzed repeatedly with the selection and analysis of different patches, and an identified patch can be tracked and analyzed for change over a number of sequential images.

Figure 11:
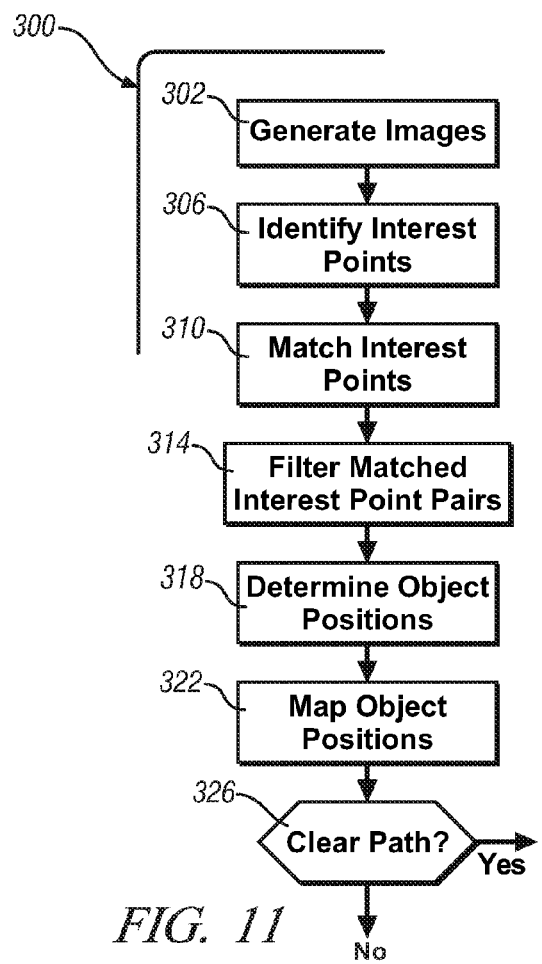
FIG. 11 is a flowchart for a texture-rich pixel-based method for detecting a clear path, in accordance with the disclosure.

FIG. 11 illustrates an exemplary texture-rich pixel-based method 300 wherein input from a camera is analyzed to determine a clear path likelihood in accordance with the disclosure. The texture-rich pixel-based method 300 is illustrated in FIG. 11, and described herein as comprising discrete elements. Such illustration is for ease of description and it should be recognized that the functions performed by these elements may be combined in one or more devices, e.g., implemented in software, hardware, and/or application-specific integrated circuitry. For example, the pixel-based method 300 may be executed as one or more algorithms in the processing module 120.

During operation, the camera 110 generates an image for analysis in the processing module 120 (302). The processing module 120 analyzes the image for interest points, for example, examining pixel color intensity as described hereinabove and comparing the pixel or a group of pixels with surrounding pixels. An interest point is an identifiable pixel on an image and is associated with a set of visual information, i.e., texture-rich features, and is associated with objects located in the field-of-view. Through methods known in the art, e.g., a scale-invariant feature transform (SIFT), methods employing corner detection or other shape detection, or a Sobel filter, interest points can be identified and utilized to accomplish methods described herein (306). In one embodiment, redundant interest points, e.g., multiple interest points corresponding to the same feature, are removed for computational efficiency considerations.

Once the interest points are identified, the processing module 120 compares sequential images when the vehicle is in motion to match interest points from each image to corresponding points in the sequential images which correspond to the same points in the field-of-view, where possible (310). Matching includes using correspondence matching programming, e.g., a scale-invariant feature transform (SIFT) feature matching programming and optical flow programming, and may further include locating corresponding points through template matching, taking into account movement of the host vehicle, and making a best estimate whether two points represent the same object or feature visible in the field-of-view. Template matching may be determined using one of multiple methods, including one of several known template matching programming methods to find the corresponding interest points, e.g., Lucas-Kanade or Horn-Schunck. The resulting matched point pairs correspond to a same feature located on both images wherein the same feature is associated with a same object in the field-of-view. While interest points can be matched, not all matched corresponding point pairs represent high quality corresponding point pairs that allow the identification of their three-dimensional positions in the field-of-view for classifications as a clear path for the vehicle to travel through.

The processing module 120 filters the matched corresponding point pairs in order to identify high quality corresponding point pairs that can be utilized for three-dimensional position identification with high confidence (314). Preferential matched point pairs may be selected based upon quality control criteria, e.g., distance between points, distance from image boundary, and color similarities between respective neighboring pixels. Selection of criteria to judge matched pairs can additionally be made based upon conditions such as light level present outside the vehicle, weather, speed of the vehicle, and any other factor affecting an ability to judge matched pairs or an urgency to quickly and accurately define a clear path.

The high quality corresponding point pairs are analyzed to determine three-dimensional positions of objects in the field-of-view represented by the corresponding point pairs (318). It will be appreciated that corresponding points at different heights as compared to ground level will move differently between sequential images. Analyzing movement of the interest points between sequential images can yield estimated three-dimensional coordinates of the interest points. Object position can be determined based upon the high quality corresponding point pairs, sample time between sequential images, and vehicular data such as vehicle speed, and vehicle yaw rate. These methods of triangulation can yield a position of the object in a horizontal plane and a height of the object in relation to a ground level.

The determined object positions are utilized to map object positions in front of the host vehicle including an estimated topography of the field-of-view (322). The topography may be estimated by assigning predetermined spatial dimensions around the object. Preferably, the predetermined spatial dimensions diminish with respect to height at a predetermined rate with respect to distance from the object. Using the map and estimated topography the processing module 120 can determine a clear path in front of the host vehicle (326).

The above method utilizes sequential images to establish a map of object positions and vertical heights in front of the vehicle, such that a clear path can be defined. It will be appreciated that in any two given images, a particular object might not be classified as including two high quality interest points sufficient to be mapped in that particular analysis. However, the above analysis occurs multiple times per second of vehicle travel. As the vehicle travels forward through the clear path, different perspectives upon an object will be gained and a large number of images will be analyzed. Travel over a path and analysis of the multiple iterative images through that path build a confidence through the analyses that no object contradicting the clear path exists in the identified clear path.

Figure 12:
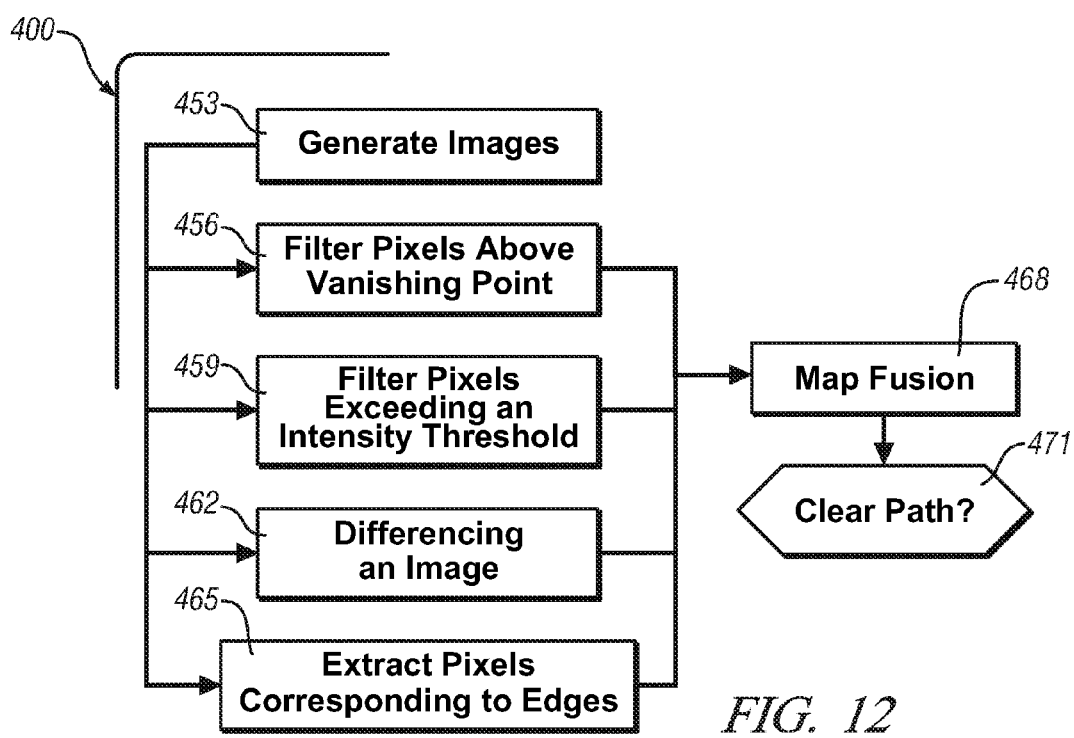
FIG. 12 is a flowchart for a textureless pixel-based method for detecting a clear path, in accordance with the disclosure.

FIG. 12 illustrates an exemplary textureless pixel-based method 400 wherein input from a camera is analyzed to determine a clear path likelihood in accordance with the disclosure. The textureless pixel-based method 400 is illustrated in FIG. 12, and described herein as comprising discrete elements. Such illustration is for ease of description and it should be recognized that the functions performed by these elements may be combined in one or more devices, e.g., implemented in software, hardware, and/or application-specific integrated circuitry. For example, the textureless pixel-based method 400 may be executed as one or more algorithms in the processing module 120.

During operation, the camera 110 generates an image for analysis in the processing module 120 (453). The processing module 120 analyzes the image using multiple filtering methods to identify and remove non-conforming pixels from the image. Remaining pixels indicate a potential clear path for the vehicle to travel. FIG. 12 shows the textureless pixel-based method 400 including four exemplary filtering methods to identify and remove non-conforming pixels from the image. A textureless method could be used with some portion of the four exemplary methods and/or can include unnamed but similar methods to process the image.

A first exemplary filtering method removes pixels above a horizon or vanishing point, including sky and other vertical features that cannot be part of a road surface (456). The term "vanishing point" as used herein is a broad term, and is to be given its ordinary and customary meaning to one ordinarily skilled in the art, and refers to an infinite far point on the horizon that is intersected by multiple parallel lines on the ground in the view. Identifying a road surface creating a clear path on which to drive is necessarily below the vanishing point or horizon line. Filtering images to only analyze an area below the horizon line helps to clarify the pixels being analyzed to identify a road surface from irrelevant pixels. As one skilled in the art appreciates, there are many known methods for determining a vanishing point and corresponding horizon line.

A second exemplary filtering method applies a filter based upon variance in pixel color intensity, based upon a premise that a road surface will include a large surface with a visual intensity common across the surface (459). Pixels are removed from the image when an associated pixel color intensity varies greater than a predetermined threshold. For pixels associated with multiple colors, a pixel color intensity of any particular color that varies greater than the predetermined threshold may be removed from the image. The predetermined threshold may be updated based upon historical color intensity of pixels identified as clear.

A third exemplary filtering method applies a filter based upon differencing sequential images, allowing analysis of changes between the images (462). Pixels associated with a pixel color intensity that changes greater than a predetermined threshold from the sequential images may be removed from the image. In one embodiment, the adjustments are made to the images based upon motion of the vehicle so that pixels are differenced and compared as if all pixels correspond to points at a ground level. Known triangulation methods may be used for determining motion adjustments to the images. By using an assumption that all objects in the image are at ground level, non ground level points may be identified by changes not consistent with pixels associated with the ground level. For example, pixels above ground level may move faster between sequential images than would be expected, and this movement may be identified by examining the difference between pixel color intensities between sequential images.

A fourth exemplary filtering method applies a filter based upon identifying pixels representing edges or transitions in the visual data (465). To create the fourth filtered image, the processing module 120 extracts pixels from the image based upon color intensity values that correspond to edges using one of several known edge detection filters, e.g., a Sobel filter. The edge detection filter is preferably executed in the processing module 120, but may be combined in one or more devices, e.g., implemented in software, hardware, and/or application-specific integrated circuitry. In one embodiment, each pixel is analyzed using a Sobel operator. The Sobel operator computes a gradient vector of color intensity at each pixel resulting in a direction of the largest possible increase from light to dark and the rate of change in that direction. Points corresponding to a rate of change exceeding a threshold and corresponding to gradient vectors at nearby pixels indicate edges and are included in the fourth filtered image. Those pixels are included in the image while the others are removed.

Applying the various methods in parallel, the results can be the fused into a single map of the image (468). Fusion includes pixels identified in each of the various filtering methods. Pixels on the fused clear path map correspond to desirable driving locations in the field-of-view. Locations on the fused clear path map without pixels correspond to undesirable driving locations in the field-of-view. The processing module 120 may analyze the map for visual data indicative of a clear path of travel (471).

The textureless pixel-based method 400, described in FIG. 12, applies various methods to images in parallel to identify features in a view relevant to defining a clear path. However, it will be appreciated that these methods need not be performed in parallel, but rather the methods can be used to process images sequentially in steps or selectively to identify features in a view relevant to defining a clear path.

An addition pixel-based clear path detection method includes applying a fused texture-rich and textureless method.

The texture-rich and textureless methods can be fused in a number of ways. An image with identified points and determined heights identified with texture-rich methods can be overlaid with a filtered image generated by textureless methods, and agreement of the two methods can be used to define a clear path through the overlaid image. In an alternative method to fuse the two schemes, the data from each of the two schemes can be used to project information upon a programmed overhead map of an area in front of the vehicle, and this overhead map including data gained from analysis of the two schemes can include building confidence indications for regions of the map. In an alternative method to fuse the two schemes, one scheme can be utilized as a primary or dominant scheme, and the second scheme can be utilized or activated to analyze regions in the view identified as ambiguous or unclear. In any method to fuse the two schemes, strengths of one processing scheme can be used to reduce weaknesses of the other processing scheme. If both schemes concur that the path is clear, then the processing module employing the schemes may determine with increased confidence that the path is desirable for the vehicle to traverse. A number of methods to fuse the identified schemes are envisioned, and the disclosure is not intended to be limited to the particular embodiments described herein. Additionally, either scheme or both schemes can be combined with the method employed above utilizing analysis of patches.

One skilled in the art will recognize that lighting normalization may be applied to the captured image data. Normalization is a process which changes the range of pixel intensity values. The purpose of the normalization is to bring the image into a range that is more suitable for machine process to improve the reliability. For example, each pixel value is normalized to be a zero mean and unit variance to enhance the image contrast, specifically in a low lighting environment or when contrast is poor due to glare.

As described above, an example-based method can be utilized alternatively or additionally to define a clear path based upon an input image. An exemplary example-based method can be described by collecting a number of sample images of views, defining a clear path for each of the sample images, matching a current image to one or more of the sample images, and determining a clear path based upon the matching. Matching the current image to one or more of the sample images can be accomplished, for example, by extracting features by methods described herein from each of the sample images, extracting features from the current image, comparing the extracted features from the current image to a database of extracted features from the sample images, and selecting matching sample images to the current image. A clear path can be selected from the best matching sample image or can be determined based upon a combination of the closest matches to the current image.

Figure 15:
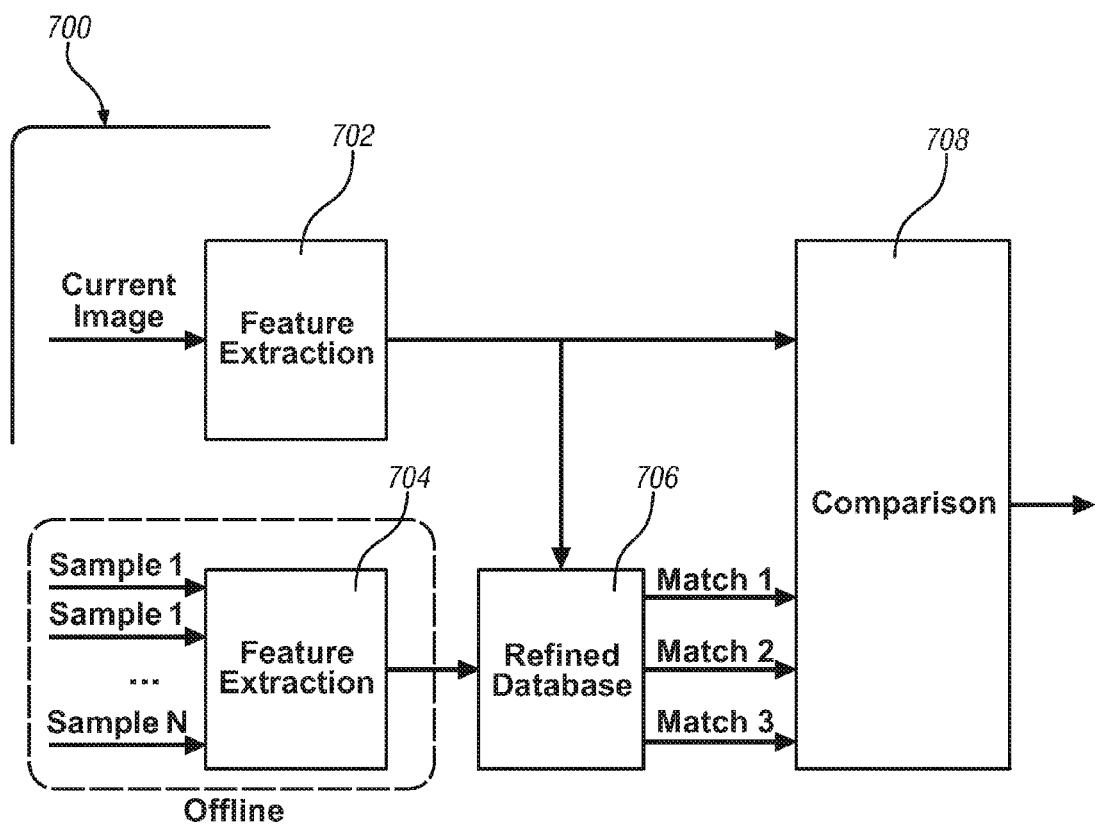
FIG. 15 schematically depicts operation of an exemplary example-based method, in accordance with the present disclosure.

FIG. 15 schematically depicts operation of an exemplary example-based method, in accordance with the present disclosure. The example-based method 700 is illustrated in FIG. 15, and described herein as comprising discrete elements. Such illustration is for ease of description and it should be recognized that the functions performed by these elements may be combined in one or more devices, e.g., implemented in software, hardware, and/or application-specific integrated circuitry. For example, the pixel-based method 700 may be executed as one or more algorithms in the processing module 120.

Method 700 illustrates comparison of a current image to a number of example or sample images to determine a clear path. As described above, a number of sample images are analyzed through feature extraction (704), and the features determined, for example, in an offline training process, are stored in a refined database. Method 700 inputs a current image and performs feature extraction upon the image (702). Current features of the current image are generated. The current features are utilized to select one or more matches in the refined database to the current features (706). In this exemplary embodiment, three matching feature sets are identified. The corresponding images of the matches are then compared to the current image, and a clear path for the current image is determined or inferred based upon the clear path for the matching sample image or images (708).

One having skill in the art will appreciate that an example-based method as described above can be useful to judge situations wherein visual differences between surfaces, for example, similar colors or isotropic textures not having a dominant direction, or less distinctive features in an image might not lend to accurate results from the other exemplary methods described herein. In such instances, the human-defined clear paths of the sample images can provide superior input to the location of the clear path. Additionally, it will be appreciated that ambiguities or weaknesses in camera detection, for example, a large radial distortion present in some camera images or clustered background buildings, can distort or create inaccuracies in interpretations of images according to other methods described herein. However, such ambiguities or weaknesses in images exist both in the sample images and the current image used in the disclosed example-based method and, therefore, tend to cancel out. In particular, as described with respect to the hierarchical method disclosed herein, the example-based method provides an alternative method to process an image and identifies a clear path in cases wherein a patch-based method and/or a pixel based method cannot clearly identify the clear path.

As described above, the exemplary patch-based and pixel-based methods are useful to analyze a patch or pixel details within a patch to judge whether the patch represents a clear path or not a clear path. The example, based method, on the other hand, determines or infers a location of a clear path upon a current image. Applied to the hierarchical method, the determined clear path from the example-based method can be compared to the location of the patch being further analyzed, and the patch can be labeled as clear or not clear based upon the comparison.

Methods are disclosed herein for detecting a clear path of travel for a vehicle using hierarchical configurations of clear path detection algorithms arranged based upon computational intensity. In the hierarchical configuration, less computationally intensive detection methods identify clear paths in the image and leave remaining sections of the image not identified as a clear path for more computationally intensive analysis. In this way, computational efficiency for clear path identification is increased. As described above, the particular methods utilized and the hierarchical structure of the particular hierarchical method used can differ or change. A first exemplary method for detecting a clear path using a hierarchical configuration includes using a patch-based clear path detection method and a pixel-based clear path detection method. The patch-based clear path detection method identifies clear paths in the image first, and the pixel-based clear path detection method is used to analyze the remaining sections of the image not identified as a clear path by the patch-based method. A second exemplary method disclosed herein incorporates an additional hierarchical layer. In the second method an example-based method further analyzes sections not identified as a clear path by the pixel-based method.

Further exemplary embodiments of hierarchical configurations are envisioned. For example, a hierarchical configuration can be defined to include a patch-based method, then a pixel-based method, and then another pixel-based method. In another example, the hierarchical configuration can be defined to include a pixel-based method, then a fusion of pixel-based methods, then an example-based method. It will be appreciated that such a configuration, no longer tied to patches of a patch-based method, could define the regions of the image to be analyzed by the different layers of the hierarchy differently. For example, a pixel-based method could identify a circular region or a cluster of pixels, and only that region or cluster could then be analyzed by a subsequent clear path method. A number of different hierarchical configurations are envisioned, and the disclosure is not intended to be limited to the particular embodiments described herein.

Figure 13:
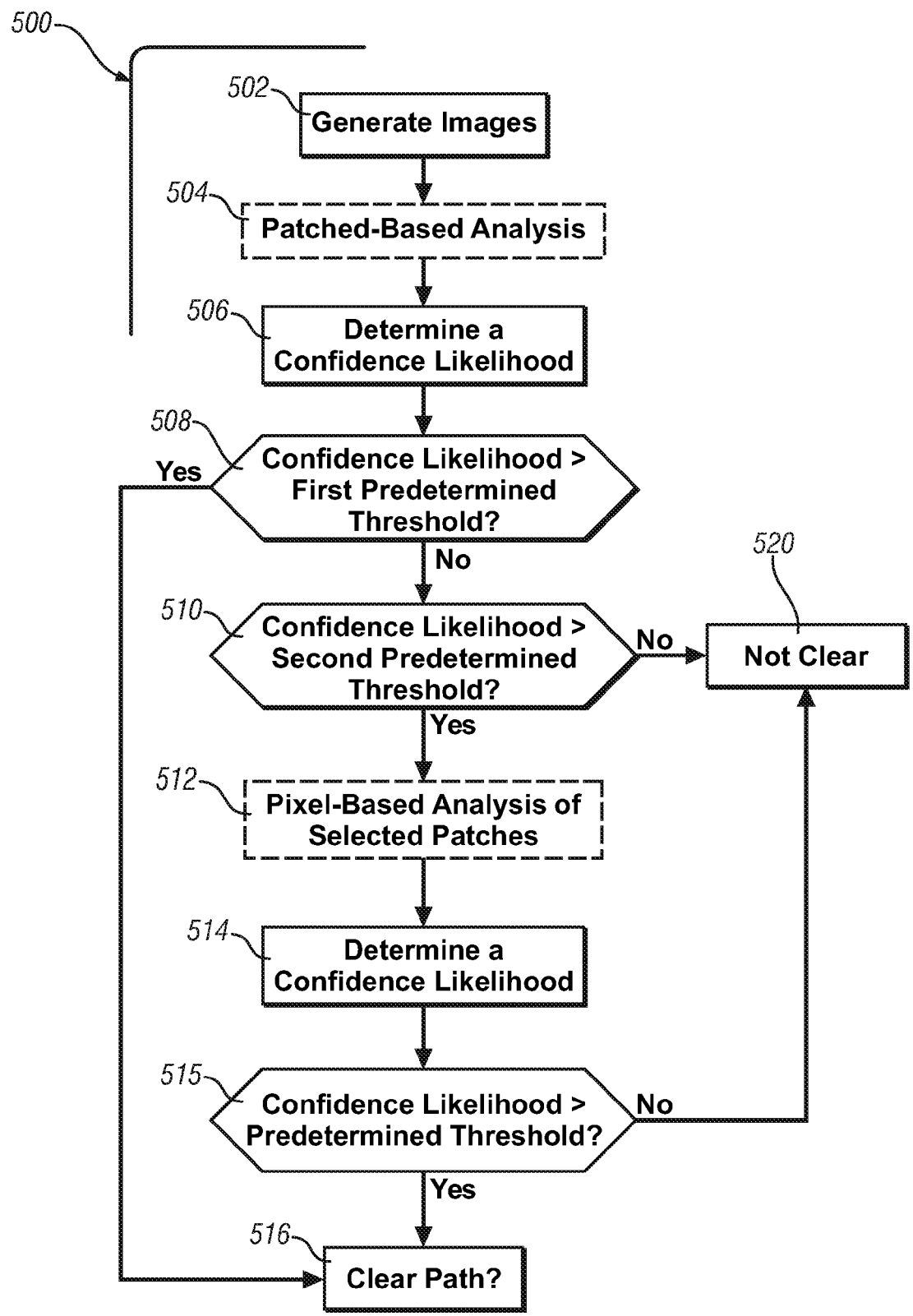
FIG. 13 is a flowchart for detecting a clear path of travel for a vehicle using a first hierarchical configuration of clear path detection methods, in accordance with the disclosure.

FIG. 13 shows a flowchart for a control scheme 500 for detecting a clear path of travel for a vehicle using an exemplary hierarchical configuration of clear path detection methods including a patch-based method and a pixel-based method. The control scheme 500 is depicted as a plurality of discrete elements. Such illustration is for ease of description and it should be recognized that the functions performed by these elements may be combined in one or more devices, e.g., implemented in software, hardware, and/or application-specific integrated circuitry. For example, the control scheme 500 may be executed as one or more algorithms in the processing module 120.

During operation, the camera 110 generates an image for analysis in the processing module 120 (502). The images are analyzed using one of the patch-based clear path detection methods described hereinabove (504). The processing module 120 identifies within the images, using the patch-based method, a plurality of component patches. Each of the component patches are analyzed for features using the patch-based method to determine a confidence likelihood as described hereinabove (506). As described hereinabove, the confidence likelihood expresses a probability that the component patch is part of a clear path of travel for the vehicle.

After determining the confidence likelihood value for the plurality of component patches, the processing module 120 compares the confidence likelihood value to a first and second predetermined threshold to determine whether the component patch is clear, not clear, or selected for additional analysis. Component patches corresponding to a confidence likelihood greater than a first predetermined threshold as designated as clear path (508). Component patches that are not greater than the first predetermined threshold, but greater than a second predetermined threshold are selected for further analysis (510). Component patches less than the second predetermined threshold are designated as not clear (520).

After selecting some portion of the component patches for further analysis, the processing module 120 analyzes the component patches using the pixel-based clear path detection method (512). The processing module 120 applies a pixel-based clear path detection method described hereinabove to determine a confidence likelihood as described hereinabove to determine whether the selected component patch corresponds to a clear path or a not clear path based upon features identified by the pixel-based method (514). It will be appreciated that pixel-based methods make decisions based upon pixel or a group of pixels. This decision for the patch being analyzed can be based upon pixels contained within the patch, for example, with the patch being determined to be unclear if any or some minimum number of pixels within the patch are determined to be not clear. Component patches associated with a confidence likelihood value greater than a predetermined threshold correspond to a clear path, while component patches associated with a confidence likelihood value less than the predetermined threshold correspond to a not clear path (515).

After analyzing the selected component patches, a clear path may be identified using the component patches corresponding to a clear path (516) and component patches corresponding to a not clear path (520).

FIG. 13 describes the use of a first predetermined threshold and a second predetermined threshold to judge whether a particular patch is clear, not clear, or requires additional analysis. It will be appreciated that such a pair of thresholds can instead be described as a range of values describing when the additional analysis should be operated.

FIG. 13 further describes use of the second, lower predetermined threshold to define patches that are considered immediately to be not clear. However, one will appreciate that a similar method could be employed without the second threshold, wherein any patch not identified as clear in the first analysis would be further analyzed in the second analysis.

Figure 14:
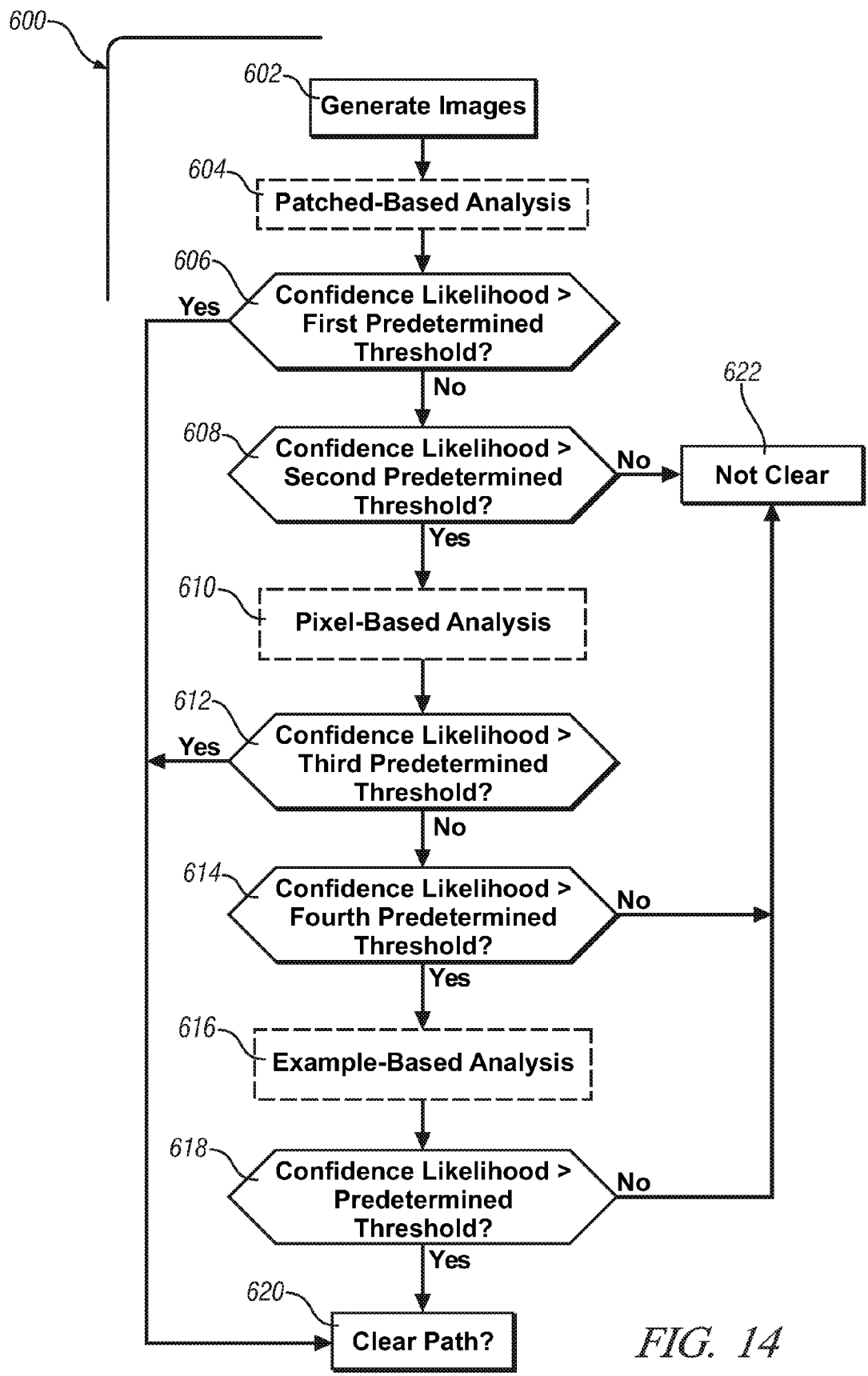
FIG. 14 is a flowchart for detecting a clear path of travel for a vehicle using a second hierarchical configuration of clear path detection methods, in accordance with the disclosure.

FIG. 14 shows a flowchart for a control scheme 600 for detecting a clear path of travel for a vehicle using a hierarchical configuration of clear path detection methods including the patch-based method, the pixel-based method, and the example-based method. The control scheme 600 is depicted as a plurality of discrete elements. Such illustration is for ease of description and it should be recognized that the functions performed by these elements may be combined in one or more devices, e.g., implemented in software, hardware, and/or application-specific integrated circuitry. For example, the control scheme 600 may be executed as one or more algorithms in the processing module 120.

During operation, the camera 110 generates an image for analysis in the processing module 120 (602). The images are analyzed using one of the patch-based clear path detection methods described hereinabove (604). The patch-based method identifies within the images a plurality of component patches and features within the component patches. After identifying features within the component patches, the processing module 120 determines a confidence likelihood for each component patch as described hereinabove using likelihood analysis. Component patches associated with a confidence likelihood greater than a first predetermined threshold as designated as clear path (606). Component patches associated with a confidence likelihood value not greater than the first predetermined threshold, but greater than a second predetermined threshold are selected for further analysis (608). Component patches associated with a confidence likelihood value less than the second predetermined threshold are designated as not clear (622).

After selecting some portion of the component patches for further analysis, the processing module 120 applies a pixel-based clear path detection method described hereinabove to determine a confidence likelihood as described hereinabove to determine whether the selected component patch corresponds to a clear path or a not clear path (610). The pixel-based method identifies features for use in the likelihood analysis used hereinabove to determine confidence values for the component patch. Component patches associated with a confidence likelihood value greater than a third predetermined threshold correspond to a clear path (612). Component patches associated with a confidence likelihood value not greater than the third predetermined threshold, but greater than a fourth predetermined threshold are selected for further analysis (614). Component patches associated with a confidence likelihood value less than the second predetermined threshold are designated as not clear (622).

After selecting the pixels, the processing module 120 analyzes the pixels using an exemplary example-based clear path detection method and a confidence likelihood is determined (616). Component patches associated with a confidence likelihood value greater than a predetermined threshold correspond to a clear path (618). Component patches associated with a confidence likelihood value less than the second predetermined threshold are designated as not clear (622).

After analyzing the selected component patches, a clear path may be identified using the component patches and pixels corresponding to a clear path (620) and/or component patches and pixels corresponding to a not clear path (622).

FIG. 14 describes a series of thresholds, and the thresholds are given a series of numerical labels (first, second, third, etc.) It will be appreciated that these labels are given for the purpose of merely showing the thresholds as potentially distinct from each other. The upper and lower thresholds for each comparison can be different or the same. However, the labels are given depiction in FIG. 14 only and no meaning outside of the potential distinctiveness should be implied by the numerical labels.

The above hierarchical configurations or methods, in the various contemplated embodiments, define the various stages of the hierarchy based upon computational or processing complexity, preferring to utilize non-intensive methods before utilizing more intensive methods. However, it will be appreciated that computational intensity is not the only consideration that can be utilized to define the particular method utilized in each stage of the hierarchy. For example, under normal conditions, the hierarchy of FIG. 14 can be utilized, with the method using a patch-based method first, then a pixel-based method, and finally an example-based method. However, the order of the methods used or disqualification or substitution of one of the methods can be implemented based upon perceived factors. For example, travel over a dirt road or a snow covered road may yield particularly poor results for one of the methods. Similarly an urban environment with rapidly changing traffic conditions or pedestrian traffic may yield particularly poor results for one of the methods. Contamination of the image from the camera caused by a spot upon the lens of the camera may similarly cause poor results from one of the methods. Vehicle speed may affect the quality of results from one of the methods. Such factors can be determined experimentally, computationally, or be judged based upon modeling or any other method sufficient to accurately estimate effectiveness of the various clear path methods to determine a clear path based upon the input image. Additionally, methods such as machine learning algorithms or fuzzy logic can be implemented to adapt selection of the various clear path methods for use in the hierarchical method based upon in-vehicle use of the various clear path methods and the resulting operation of the vehicle. Such operation of the vehicle can be judged in many ways known in the art, such as monitoring an occurrence of operator intervention in control of the vehicle or by monitoring location of lane markers in images describing subsequent control of the vehicle upon the roadway. A number of methods to select between clear path methods and to adjust selection of the various clear path methods are envisioned, and the disclosure is not intended to be limited to the particular exemplary embodiments disclosed herein.

As illustrated in FIGS. 13 and 14, a number of threshold confidence likelihoods are depicted for comparison to confidence likelihoods developed in each layer of the hierarchical methods. It will be appreciated that these thresholds can each be different and distinct, capable of being described as a first threshold, a second threshold, a third threshold, etc. Some of the threshold can be common, for example, with common thresholds defining when the particular patch is a clear path. The precise levels of each of the thresholds is dependent upon the clear path methods used to analyze the patch and may be developed experimentally or by any method sufficient to estimate or evaluate operation of the image processing methods employed.

As mentioned above, processing module 120 may include algorithms and mechanisms to actuate autonomous driving control by means known in the art and not described herein, or processing module 120 may simply provide information to a separate autonomous driving system. Reactions to perceived objects can vary, and include but are not limited to steering changes, throttle changes, braking responses, and warning and relinquishing control of the vehicle to the operator.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for detecting a clear path of travel for a vehicle free of objects limiting travel of the vehicle using an image of a roadway generated by a camera, the method comprising:
    monitoring the image;
    utilizing a first patch-based analysis of the image comprising dividing the image into a plurality of patches, and
        analyzing each patch from the plurality of patches to determine a patch specific first likelihood value that a patch being analyzed represents a portion of the clear path of travel, the analysis of each patch comprising:
            analyzing the image while avoiding identification and classification of individual objects in the image to formulate the clear path including presuming all of the image as clear,
            using a non-pixelated analysis, determining whether an interesting feature indicating an object upon the roadway within the patch being analyzed is present,
            if the interesting feature is present within the patch being analyzed, extracting a feature from the patch being analyzed, and
            determining the patch specific first likelihood value based upon said feature; and
        for each patch including the interesting feature, comparing the patch specific first likelihood value to a first threshold confidence likelihood and including the patch including the interesting feature within a first set of clear path patches if the patch specific first likelihood value is greater than the first threshold confidence likelihood;
    utilizing a second pixel-based analysis comprising
        identifying a subset of the plurality of patches from the first analysis, the subset including all patches that have a patch specific first likelihood value less than the first threshold confidence likelihood;
        analyzing each patch of the subset to determine a patch specific second likelihood value that the patch of the subset being analyzed represents a portion of the clear path of travel; and
        for each patch of the subset, comparing the patch specific first likelihood value to a second threshold confidence likelihood and including the patch of the subset being analyzed within a second set of clear path patches if the patch specific first likelihood value is greater than the first threshold confidence likelihood; and
    identifying the clear path of travel for the vehicle based upon the first and second sets of clear path patches.

2. Method for detecting a clear path of travel for a vehicle using an image generated by a camera, the method comprising:
    monitoring the image;
    utilizing a first patch-based analysis of the image comprising dividing the image into a plurality of patches, and
        analyzing each patch from the plurality of patches to determine a patch specific first likelihood value that a patch being analyzed represents a portion of the clear path of travel;
    comparing the patch specific first likelihood value for each patch to a first threshold confidence likelihood and defining a portion of the plurality of patches as a first set of clear path patches based upon the plurality of patches wherein the patch specific first likelihood value being greater than the first threshold confidence likelihood;
    for each of the plurality of patches wherein the patch specific first likelihood value is not greater than the first threshold confidence likelihood, comparing the patch specific first likelihood value to a third threshold confidence likelihood;
    utilizing a second analysis upon a portion of the plurality of patches with the first clear path confidence not greater than the first threshold confidence likelihood and with the first clear path confidence likelihood greater than the third threshold confidence likelihood to determine a patch specific second likelihood value that a patch analyzed by the second analysis represents a portion of the clear path of travel;
    defining a second set of clear path patches to include the plurality of patches wherein the patch specific second likelihood value is greater than a second threshold confidence likelihood; and
    identifying the clear path of travel for the vehicle based upon the first and second sets of clear path patches.

3. The method of claim 2, further comprising defining each of the plurality of patches with the patch specific first likelihood value not greater than the third threshold confidence likelihood as a not clear path patch.

4. The method of claim 1, further comprising defining each of the plurality of patches with the patch specific second likelihood value not greater than the second threshold confidence likelihood as a not clear path patch.

5. The method of claim 1, wherein the second pixel-based analysis comprises a texture-rich clear path analysis method.

6. The method of claim 1, wherein the second pixel-based analysis comprises a textureless clear path analysis method.

7. The method of claim 1, wherein the second pixel-based analysis comprises a fusion of a texture rich clear path analysis method and a textureless clear path analysis method.

8. The method of claim 1, wherein the second pixel-based analysis comprises an example-based clear path analysis method.

9. Method for detecting a clear path of travel for a vehicle using an image generated by a camera, the method comprising:
    monitoring the image;
    utilizing a first patch-based analysis of the image comprising
        dividing the image into a plurality of patches, and analyzing each patch from the plurality of patches to determine a patch specific first likelihood value that a patch being analyzed represents a portion of the clear path of travel;

comparing patch specific first likelihood value for each patch to a first threshold confidence likelihood and defining a portion of the plurality of patches as a first set of clear path patches based upon the plurality of patches wherein the patch specific first likelihood value being greater than the first threshold confidence likelihood;

utilizing a second analysis upon a portion of the plurality of patches with the first clear path confidence not greater than the first threshold confidence likelihood to determine a patch specific second likelihood value that a patch analyzed by the second analysis represents a portion of the clear path of travel;

defining a second set of clear path patches to include the plurality of patches wherein the patch specific second likelihood value is greater than a second threshold confidence likelihood;

utilizing a third analysis upon a portion of the plurality of patches with the first clear path confidence not greater than the first threshold confidence likelihood to determine a patch specific third likelihood value that a patch analyzed by the third analysis represents a portion of the clear path of travel;

defining a third set of clear path patches to include all the plurality of patches wherein the patch specific third likelihood value is greater than a third threshold confidence likelihood; and identifying the clear path of travel for the vehicle based upon the first, second, and third sets of clear path patches.

10. The method of claim 9, further comprising, for each patch analyzed by the second analysis, comparing the patch specific second likelihood value to a fourth threshold confidence likelihood; and wherein utilizing the third analysis further comprises utilizing the third analysis only upon a portion of the plurality of patches analyzed by the second analysis with the patch specific second likelihood value greater than the fourth threshold confidence likelihood.

11. The method of claim 10, further comprising defining each of the plurality of patches analyzed by the second analysis with the patch specific second likelihood value not greater than the fourth threshold confidence likelihood as a not clear path patch.

12. The method of claim 9, further comprising defining each of the plurality of patches analyzed by the third analysis with the patch specific third likelihood value not greater than the third threshold confidence likelihood as a not clear path patch.

13. The method of claim 9, wherein the third analysis comprises a pixel-based clear path analysis method.

14. The method of claim 9, wherein the third analysis comprises an example-based clear path analysis method.

15. Method for detecting a clear path of travel for a vehicle free of objects limiting travel of the vehicle using an image of a roadway generated by a camera, the method comprising:

monitoring the image;

utilizing a first patch-based analysis of the image comprising dividing the image into a plurality of patches, and analyzing each patch from the plurality of patches to determine a patch specific first likelihood value that a patch being analyzed represents a portion of the clear path of travel, the analysis of each patch comprising:

analyzing the image while avoiding identification and classification of individual objects in the image to formulate the clear path including presuming all of the image as clear, using a non-pixelated analysis, determining whether an interesting feature indicating an object upon the roadway within the patch being analzyed is present, if the interesting feature is present within the patch being analyzed, extracting a feature from the patch being analyzed, and determining the patch specific first likelihood value based upon said feature; and for each patch including the interesting feature, comparing the patch specific first likelihood value to a first threshold confidence likelihood and including the patch including the interesting feature within a first set of clear path patches if the patch specific first likelihood value is greater than the first threshold confidence likelihood;

utilizing a second pixel-based analysis comprising identifying a subset of the plurality of patches from the first analysis, the subset including all patches that have a patch specific first likelihood value less than the first threshold confidence likelihood;

analyzing each patch of the subset to determine a patch specific second likelihood value that the patch of the subset being analyzed represents a portion of the clear path of travel; and for each patch of the subset, comparing the patch specific first likelihood value to a second threshold confidence likelihood and including the patch of the subset being analyzed within a second set of clear path patches if the patch specific first likelihood value is greater than the first threshold confidence likelihood; and identifying the clear path of travel for the vehicle based upon the first and second sets of clear path patches; and utilizing the clear path of travel to navigate the vehicle.

16. Method for detecting a clear path of travel for a vehicle free of objects limiting travel of the vehicle using an image of a roadway generated by a camera, the method comprising:

monitoring the image;

utilizing a first patch-based analysis of the image comprising dividing the image into a plurality of patches, and analyzing each patch from the plurality of patches to determine a patch specific first likelihood value that a patch being analyzed represents a portion of the clear path of travel, the analysis of each patch comprising:

analyzing the image while avoiding identification and classification of individual objects in the image to formulate the clear path including presuming all of the image as clear, using a non-pixelated analysis, determining whether an interesting feature indicating an object upon the roadway within the patch being analyzed is present, if the interesting feature is present within the patch being analyzed, extracting a feature from the patch being analyzed, and determining the patch specific first likelihood value based upon said feature; and for each patch including the interesting feature, comparing the patch specific first likelihood value to a first threshold confidence likelihood and including the patch including the interesting feature within a first set of clear path patches if the patch specific first likelihood value is greater than the first threshold confidence likelihood;
utilizing a second pixel-based analysis comprising
identifying a subset of the plurality of patches from the first analysis, the subset including all patches that have a patch specific first likelihood value less than the first threshold confidence likelihood;
analyzing each patch of the subset to determine a patch specific second likelihood value that the patch of the subset being analyzed represents a portion of the clear path of travel; and
for each patch of the subset, comparing the patch specific first likelihood value to a second threshold confidence likelihood and including the patch of the subset being analyzed within a second set of clear path patches if the patch specific first likelihood value is greater than the first threshold confidence likelihood; and
identifying the clear path of travel for the vehicle based upon the first and second sets of clear path patches; and
utilizing the clear path of travel to navigate the vehicle;
wherein the second pixel-based analysis comprises an example based analysis.

* * * * *